(12) United States Patent
Cuenca

(10) Patent No.: US 9,981,402 B2
(45) Date of Patent: May 29, 2018

(54) CIRCULAR SAW MITER SYSTEM

(71) Applicant: Fernando Cuenca, Maspeth, NY (US)

(72) Inventor: Fernando Cuenca, Maspeth, NY (US)

( * ) Notice: Subject to any disclaimer, the term of this patent is extended or adjusted under 35 U.S.C. 154(b) by 130 days.

(21) Appl. No.: 15/069,601

(22) Filed: Mar. 14, 2016

(65) Prior Publication Data

US 2017/0259451 A1 Sep. 14, 2017

(51) Int. Cl.
*B27B 9/04* (2006.01)
*B23D 59/00* (2006.01)

(52) U.S. Cl.
CPC .............. *B27B 9/04* (2013.01); *B23D 59/007* (2013.01)

(58) Field of Classification Search
CPC .......... B26B 11/00; B27B 9/04; B23D 59/007
USPC ........................................................ 83/468.4
See application file for complete search history.

(56) References Cited

U.S. PATENT DOCUMENTS

| | | | |
|---|---|---|---|
| 4,007,657 A * | 2/1977 | Burch .................. | B23D 47/025 83/471.3 |
| 4,159,821 A * | 7/1979 | Hickman ............. | B23D 59/007 269/139 |
| 4,237,762 A | 12/1980 | Winter | |
| 4,320,678 A | 3/1982 | Volk | |
| 4,489,634 A | 12/1984 | Volk | |
| 4,522,098 A | 6/1985 | Bliss | |
| 5,080,152 A * | 1/1992 | Collins ................ | B23D 45/021 144/136.95 |
| 5,090,283 A | 2/1992 | Noble | |
| 6,116,304 A | 9/2000 | Wilson et al. | |
| 6,745,803 B2 | 6/2004 | Sanfilippo | |
| 6,932,073 B2 | 8/2005 | Zhang | |
| 6,990,882 B2 | 1/2006 | Schinfelder | |
| 7,497,238 B2 | 3/2009 | Williams | |
| 2010/0107840 A1* | 5/2010 | Rybka ....................... | B27B 9/02 83/446 |
| 2016/0075049 A1* | 3/2016 | Lilholt ..................... | B27B 9/04 83/743 |

* cited by examiner

*Primary Examiner* — Omar Flores Sanchez

(57) ABSTRACT

A circular saw miter system for includes a circular saw that has a guide and a blade. A stand is provided and the stand may be positioned on a support surface. The stand may have a board placed thereon. A miter is removably coupled to stand and the miter may position the board at a selected angle on the stand. A pair of tracks is provided and each of the tracks is coupled to the stand. The circular saw is slidably coupled to the tracks and the circular saw may be manipulated. Each of the tracks is positioned above the miter. Thus, the circular saw may cut the board at the selected angle.

10 Claims, 5 Drawing Sheets

FIG. 4
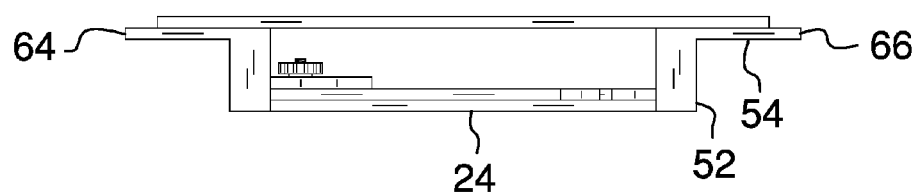
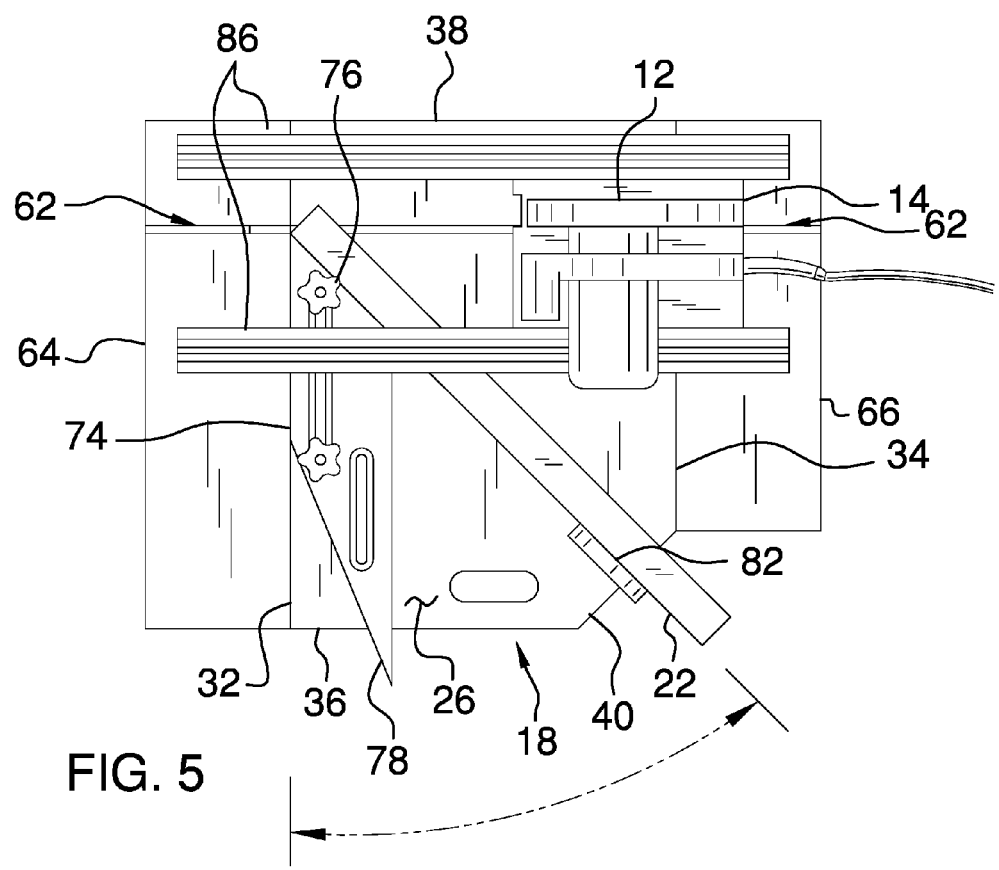
FIG. 5

CIRCULAR SAW MITER SYSTEM

BACKGROUND OF THE DISCLOSURE

Field of the Disclosure

The disclosure relates to miter devices and more particularly pertains to a new miter device for facilitating a circular saw to make mitered cuts.

SUMMARY OF THE DISCLOSURE

An embodiment of the disclosure meets the needs presented above by generally comprising a circular saw that has a guide and a blade. A stand is provided and the stand may be positioned on a support surface. The stand may have a board placed thereon. A miter is removably coupled to stand and the miter may position the board at a selected angle on the stand. A pair of tracks is provided and each of the tracks is coupled to the stand. The circular saw is slidably coupled to the tracks and the circular saw may be manipulated. Each of the tracks is positioned above the miter. Thus, the circular saw may cut the board at the selected angle.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein:

FIG. 4 is a right side view of an embodiment of the disclosure.

FIG. 5 is a top perspective in-use view of an embodiment of the disclosure.

DESCRIPTION OF THE PREFERRED EMBODIMENT

Figure 1:
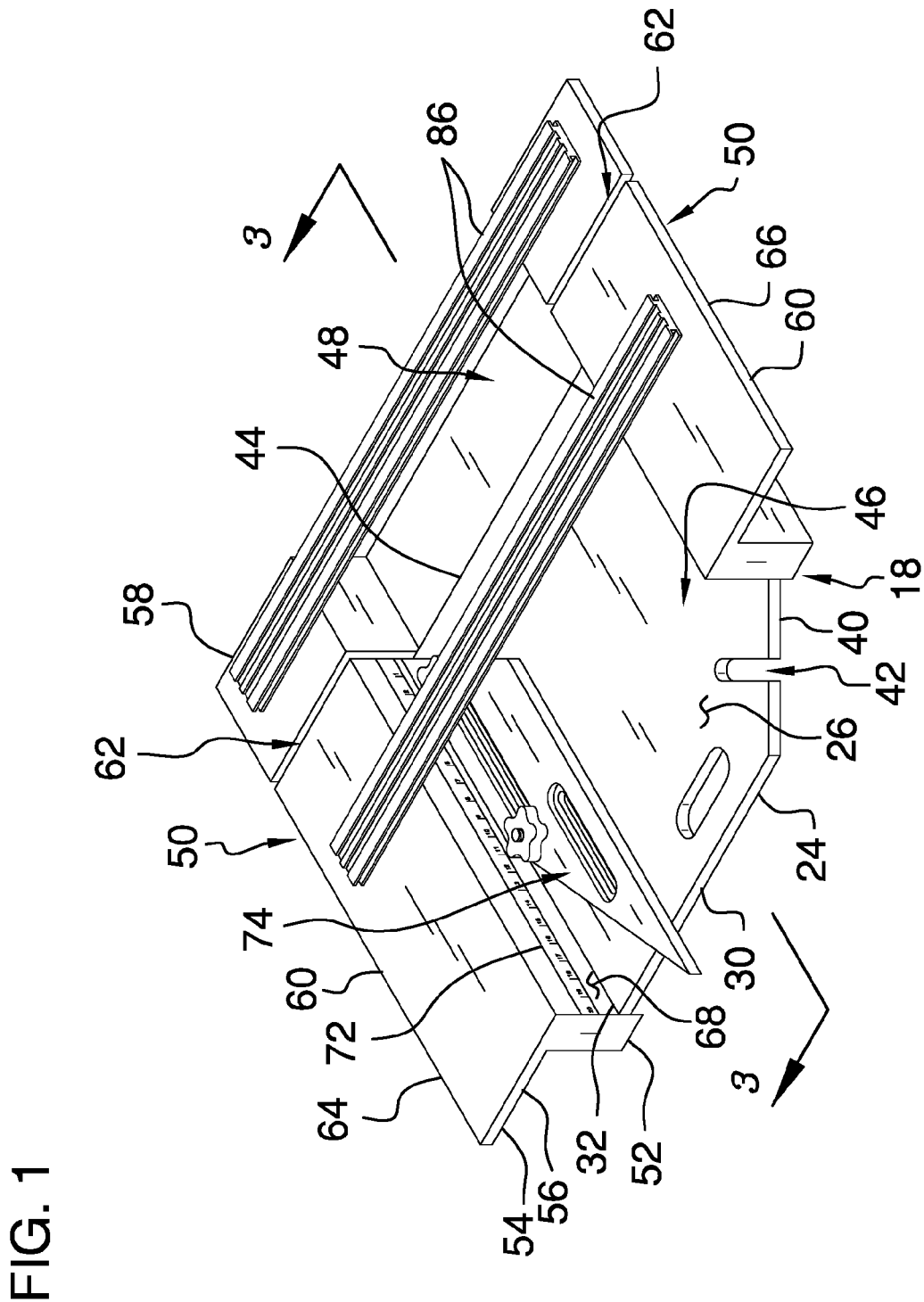
FIG. 1 is a top perspective view of a circular saw miter system according to an embodiment of the disclosure.
Figure 2:
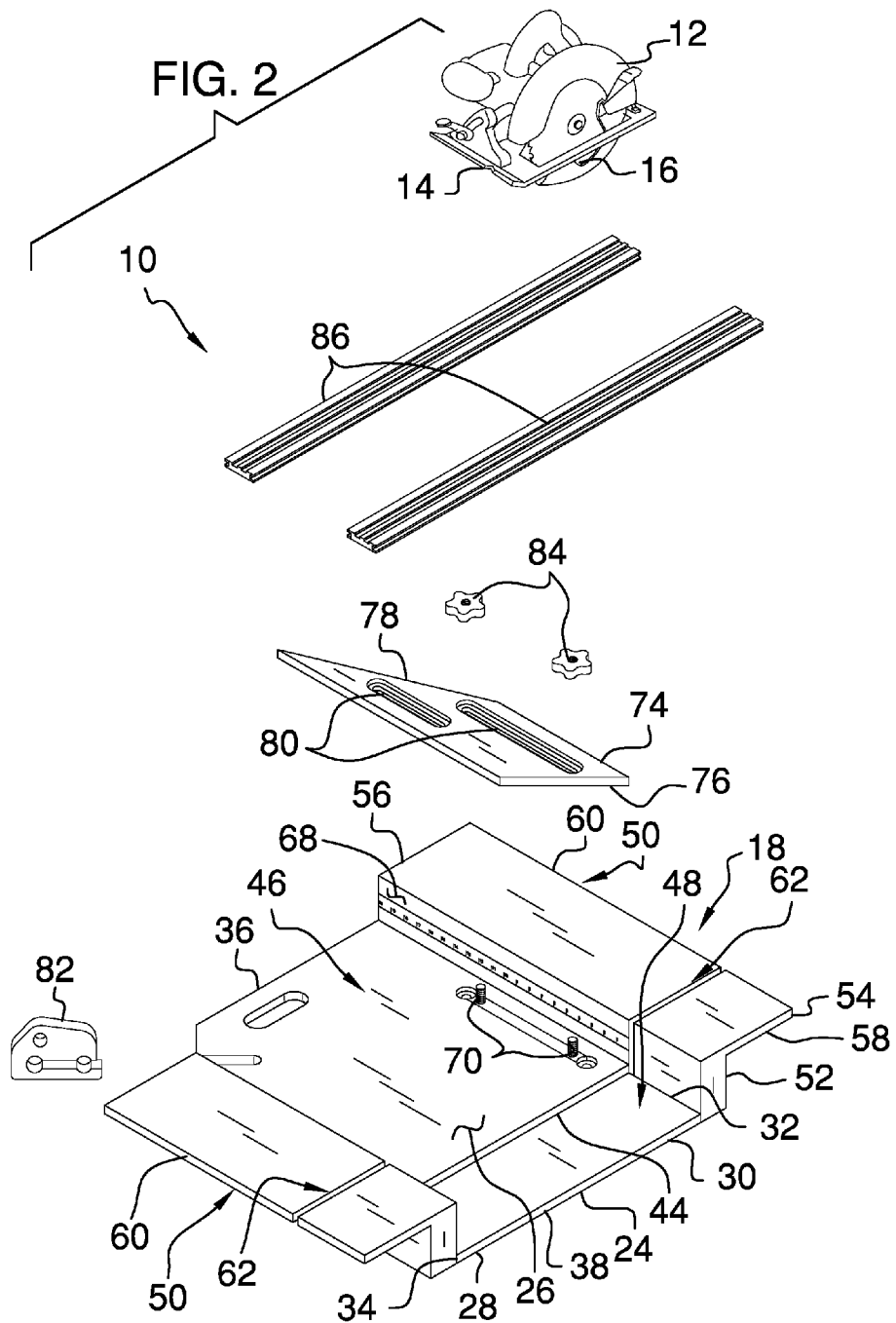
FIG. 2 is an exploded perspective view of an embodiment of the disclosure.
Figure 3:
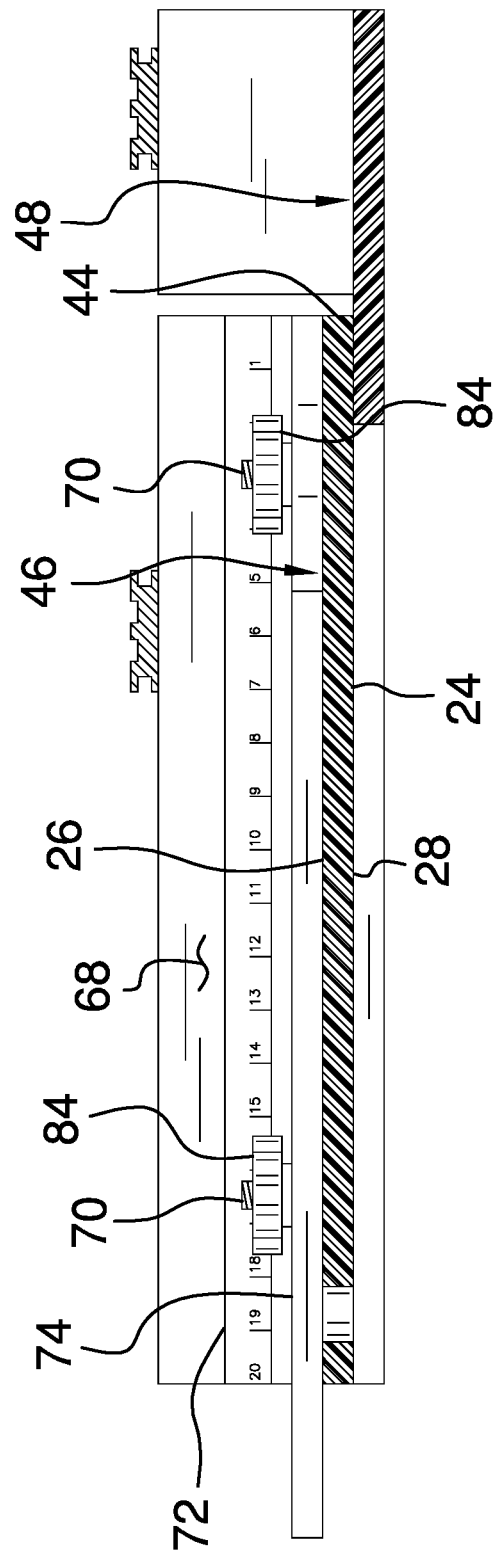
FIG. 3 is a cross sectional view taken along line 3-3 of FIG. 1 of an embodiment of the disclosure.
Figure 6:
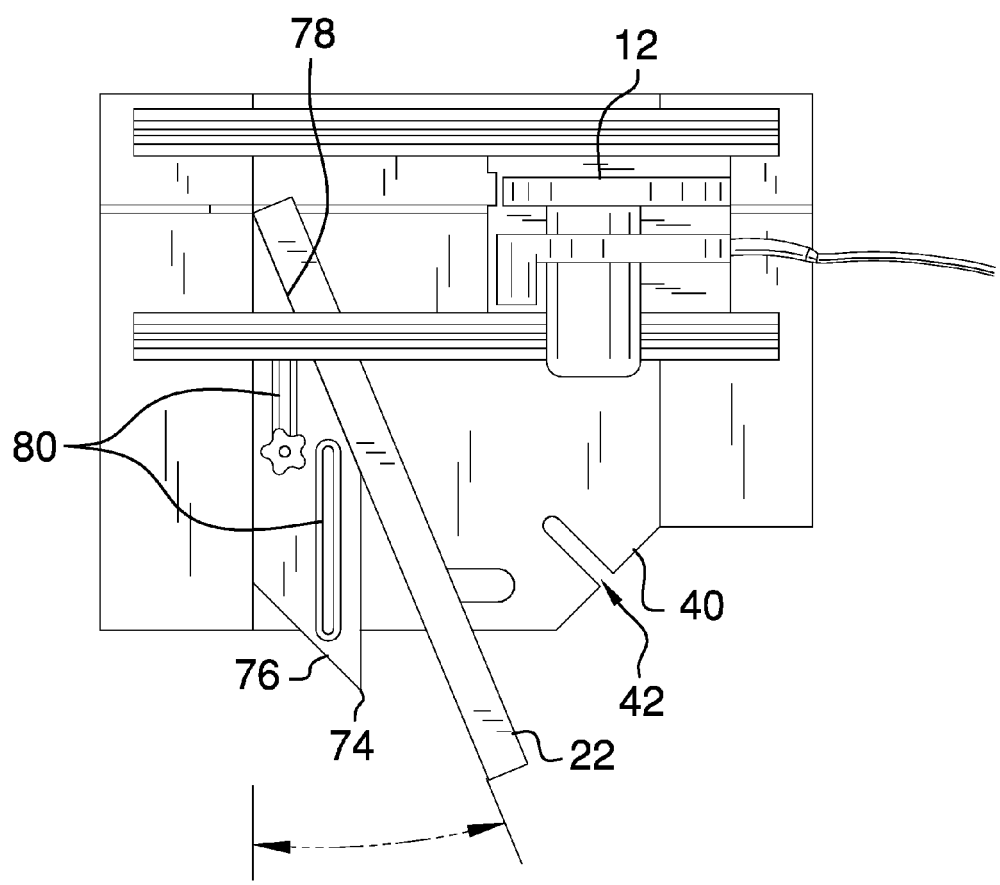
FIG. 6 is a perspective in-use view of an embodiment of the disclosure.

With reference now to the drawings, and in particular to FIGS. 1 through 6 thereof, a new miter device embodying the principles and concepts of an embodiment of the disclosure and generally designated by the reference numeral 10 will be described.

As best illustrated in FIGS. 1 through 6, the circular saw miter system 10 generally comprises a circular saw 12 that has a guide 14 and a blade 16. The circular saw 12 may be an electrical circular saw or the like. A stand 18 is provided and the stand 18 may be positioned on a support surface 20. The stand 18 may have a board 22 placed thereon. The board 22 may comprise a framing stud or the like.

The stand 18 comprises a panel 24 that has a first surface 26, a second surface 28 and a peripheral edge 30 extending therebetween. The peripheral edge 30 has a front side 32, a back side 34, a first lateral side 36 and a second lateral side 38. The second surface 28 abuts the support surface 20 when the stand 18 is positioned on the support surface 20. The peripheral edge 30 has an intersecting side 40 extending at a forty five degree angle between the first lateral side 36 and the back side 34. The intersecting side 40 has a notch 42 extending inwardly on the panel 24. The notch 42 extends along a line that is oriented perpendicular to the intersecting side 40.

The first surface 26 has a vertical edge 44 to define a first portion 46 of the panel 24 and a second portion 48 of the panel 24. The vertical edge 44 extends between the front side 32 and the back side 34. The vertical edge 44 is positioned closer to the second lateral side 38 than the first lateral side 36. The second portion 48 has a thickness that is less than a thickness of the first portion 46.

A pair of supports 50 is provided and each of the supports 50 has a leg 52 and a foot 54. The leg 52 corresponding to each of the supports 50 is coupled to and extends upwardly from the panel 24. Each of the supports 50 has a first end 56 and a second end 58, and the foot 54 corresponding to each of the supports 50 has a distal edge 60 with respect to the leg 52.

Each of the supports 50 has a slot 62 extending through the leg 52 and the foot 54. The slot 62 extends between the panel 24 and the distal edge 60. The slot 62 is positioned closer to the second end 58 than the first end 56.

The pair of supports 50 includes a first support 64 and a second support 66. The leg 52 corresponding to the first support 64 is coextensive with the front side 32. The slot 62 corresponding to the first support 64 is aligned with the vertical edge 44. The leg 52 corresponding to the second support 66 is coextensive with the back side 34. The slot 62 corresponding to the second support 66 is aligned with the vertical edge 44. The leg 52 corresponding to the first support 64 has an inwardly facing surface 68 with respect to the panel 24.

A pair of bolts 70 is provided and each of the bolts 70 is movably coupled to and extends upwardly from the first surface 26 of the panel 24. The bolts 70 are spaced apart from each other and each of the bolts 70 is positioned proximate the inwardly facing surface 68. A ruler 72 is coupled to the inwardly facing surface 68 of the first support 64. The ruler 72 is aligned with the panel 24. The ruler 72 extends between the first end 56 corresponding to the first support 64 and the slot 62 corresponding to the first support 64.

A miter 74 is removably coupled to stand 18 and the miter 74 positions the board 22 at a selected angle on the stand 18. The miter 74 abuts the inwardly facing surface 68 of the first support 64 when the miter 74 is coupled to the stand 18. The miter 74 has a first angled side 76, a second angled side 78 and a pair of slots 80 extending through the miter 74. The slots 80 are spaced apart from each other and extend substantially between the first angled side 76 and the second angled side 78.

The miter 74 is positioned in a first position having each of the bolts 70 extending upwardly through a selected one of the slots 80. The first angled side 76 faces the vertical edge 44 on the panel 24 when the miter 74 is in the first position. The first angled side 76 forms a forty five degree angle with the inwardly facing surface 68 of the first support 64. Thus, the first angled side 76 may abut the board 22 thereby facilitating the board 22 to be positioned at the forty five degree angle.

The miter 74 is positioned in a second position having each of the bolts 70 extending upwardly through a selected one of the slots 80. The second angled side 78 forms a twenty two and one half degree angle with the inwardly facing surface 68. The second angled side 78 faces the vertical edge 44 on the panel 24 when the miter 74 is in the second position. Thus, the second angled side 78 may abut the board 22 thereby facilitating the board 22 to be positioned at the twenty two and one half degree angle.

A stop 82 is slidably positioned in the notch 42 in the panel 24 when the miter 74 is positioned in the first position. The stop 82 is coextensive with the notch 42 when the stop 82 is positioned in the notch 42. Thus, the stop 82 is oriented on a plane that is planar with the first angled side 76 of the miter 74. The stop 82 may abut the board 22 when the board 22 is positioned against the first angled side 76. Thus, the board 22 is secured on the panel at the forty five degree angle.

A pair of fasteners 84 is provided. Each of the fasteners 84 engages an associated one of the bolts 70 when the miter 74 is positioned on the bolts 70. Thus, the miter 74 is removably coupled to the bolts 70. Each of the fasteners 84 may comprise a threaded knob or the like.

A pair of tracks 86 is provided and each of the tracks 86 is coupled to the stand 18. The circular saw 12 is slidably coupled to the tracks 86 and the circular saw 12 may be manipulated on the tracks 86. Each of the tracks 86 is positioned above the miter 74. Thus, the circular saw 12 may cut the board 22 at the selected angle.

Each of the tracks 86 extends between the foot 54 corresponding to the first support 64 and the foot 54 corresponding to the second support 66. Thus, each of the tracks 86 is spaced upwardly from the panel 24. Each of the tracks 86 is positioned on opposite sides of the slot 62 in each of the supports 50. The guide 14 on the circular saw 12 is slidably coupled to each of the tracks 86 having the blade 16 on the circular saw 12 positioned within the slot 62 corresponding to the second support 66. The circular saw 12 is urgeable to travel along the tracks 86 having the blade 16 travelling along the vertical edge 44 on the panel 24. Thus, the blade 16 may cut the board 22 at the first angle and the second angle when the board 22 is positioned against the miter 74.

In use, the circular saw 12 is slidably coupled to each of the tracks 86. The miter 74 is positioned in first position to make a forty five degree cut with the circular saw 12. The board 22 is positioned against the first angled side 76 of the miter 74. The circular saw 12 is turned on and the circular saw 12 is urged along the tracks 86. Thus, the circular saw 12 cuts the board 22 at the forty five degree angle. The miter 74 is positioned in the second position to make a twenty two and one half degree cut with the circular saw 12. The board 22 is positioned against the second angled side 78 of the miter 74. The circular saw 12 is turned on the circular saw 12 is urged along the tracks 86. Thus, the circular saw 12 cuts the board 22 at the twenty two and one half degree angle.

With respect to the above description then, it is to be realized that the optimum dimensional relationships for the parts of an embodiment enabled by the disclosure, to include variations in size, materials, shape, form, function and manner of operation, system and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A circular saw miter system comprising:
   a circular saw having a guide and a blade;
   a stand being configured to be positioned on a support surface, said stand being configured to have a board placed thereon, wherein said stand comprises a panel having a first surface, a second surface and a peripheral edge extending therebetween, said peripheral edge having a front side, a back side, a first lateral side and a second lateral side, said second surface being configured to abut the support surface, said peripheral edge having an intersecting side extending at a forty five degree angle between said first lateral side and said back side;
   a miter being removably coupled to said stand wherein said miter is configured to position the board at a selected angle on said stand;
   a pair of tracks, each of said tracks being coupled to said stand, said circular saw being slidably coupled to said tracks wherein said circular saw is configured to be manipulated, each of said tracks being positioned above said miter wherein said circular saw is configured to cut the board at the selected angle; and
   wherein said intersecting side has a notch extending inwardly on said panel, said notch extending along a line being oriented perpendicular to said intersecting side.

2. A circular saw miter system comprising:
   a circular saw having a guide and a blade;
   a stand being configured to be positioned on a support surface, said stand being configured to have a board placed thereon, wherein said stand comprises a panel having a first surface, a second surface and a peripheral edge extending therebetween, said peripheral edge having a front side, a back side, a first lateral side and a second lateral side, said second surface being configured to abut the support surface, said peripheral edge having an intersecting side extending at a forty five degree angle between said first lateral side and said back side;
   a miter being removably coupled to said stand wherein said miter is configured to position the board at a selected angle on said stand;
   a pair of tracks, each of said tracks being coupled to said stand, said circular saw being slidably coupled to said tracks wherein said circular saw is configured to be manipulated, each of said tracks being positioned above said miter wherein said circular saw is configured to cut the board at the selected angle; and wherein said first surface has a vertical edge to define a first portion of said panel and a second portion of said panel, said vertical edge extending between said front side and said back side, said vertical edge being positioned closer to said second lateral side than said first lateral side, said second portion having a thickness being less than a thickness of said first portion.

3. A circular saw miter system comprising:

a circular saw having a guide and a blade;

a stand being configured to be positioned on a support surface, said stand being configured to have a board placed thereon, wherein said stand comprises a panel having a first surface, a second surface and a peripheral edge extending therebetween, said peripheral edge having a front side, a back side, a first lateral side and a second lateral side, said second surface being configured to abut the support surface, said peripheral edge having an intersecting side extending at a forty five degree angle between said first lateral side and said back side;

a miter being removably coupled to said stand wherein said miter is configured to position the board at a selected angle on said stand;

a pair of tracks, each of said tracks being coupled to said stand, said circular saw being slidably coupled to said tracks wherein said circular saw is configured to be manipulated, each of said tracks being positioned above said miter wherein said circular saw is configured to cut the board at the selected angle; and a pair of supports, each of said supports having a leg and a foot, said leg corresponding to each of said supports being coupled to and extending upwardly from said panel, each of said supports having a first end and a second end, said foot corresponding to each of said supports having a distal edge with respect to said leg, each of said supports having a slot extending through said leg and said foot, said slot extending between said panel and said distal edge, said slot being positioned closer to said second end than said first end.

4. The system according to claim 3, wherein:

said panel has a vertical edge; and said pair of supports includes a first support and a second support, said leg corresponding to said first support being coextensive with said front side having said slot corresponding to said first support being aligned with said vertical edge, said leg corresponding to said second support being coextensive with said back side having said slot corresponding to said second support being aligned with said vertical edge, said leg corresponding to said first support having an inwardly facing surface with respect to said panel.

5. The system according to claim 4, further comprising a pair of bolts, each of said bolts being coupled to and extending upwardly from said first surface of said panel, said bolts being spaced apart from each other, each of said bolts being positioned proximate said inwardly facing surface.

6. The system according to claim 4, further comprising a ruler being coupled to said inwardly facing surface of said first support, said ruler being aligned with said panel, said ruler extending between said first end corresponding to said first support and said slot corresponding to said first support.

7. The system according to claim 1, wherein:

said stand includes:

a panel having a vertical edge, and a pair of bolts being coupled to said panel; and said miter has a first angled side and a second angled side, said miter having a pair of slots extending therethrough, said slots being spaced apart from each other and extending substantially between said first angled side and said second angled side;

said miter being positioned in a first position having each of said bolts extending upwardly through a selected one of said slots having said first angled side facing said vertical edge on said panel wherein said first angled side is configured abut the board thereby facilitating the board to be positioned at a first angle with respect to said panel; and said miter being positioned in a second position having each of said bolts extending upwardly through a selected one of said slots having said second angled side facing said vertical edge on said panel wherein said second angled side is configured abut the board thereby facilitating the board to be positioned at a second angle with respect to said panel.

8. The system according to claim 7, further comprising a pair of fasteners, each of said fasteners engaging an associated one of said bolts when said miter is positioned on said bolts such that said miter is removably coupled to said bolts.

9. The system according to claim 4, wherein each of said tracks extends between said foot corresponding to said first support and said foot corresponding to said second support having each of said tracks being spaced from said panel, each of said tracks being positioned on opposite sides of said slot in each of said supports, said guide on said circular saw being slidably coupled to each of said tracks having said blade on said circular saw being positioned within said slot corresponding to said second support, said circular saw being urgeable to travel along said tracks having said blade travelling along said vertical edge on said panel wherein said blade is configured to cut the board at the first angle and the second angle when the board is positioned against said miter.

10. The system of claim 1, further comprising:

said stand further comprising:

said first surface having a vertical edge to define a first portion of said panel and a second portion of said panel, said vertical edge extending between said front side and said back side, said vertical edge being positioned closer to said second lateral side than said first lateral side, said second portion having a thickness being less than a thickness of said first portion, a pair of supports, each of said supports having a leg and a foot, said leg corresponding to each of said supports being coupled to and extending upwardly from said panel, each of said supports having a first end and a second end, said foot corresponding to each of said supports having a distal edge with respect to said leg, each of said supports having a slot extending through said leg and said foot, said slot extending between said panel and said distal edge, said slot being positioned closer to said second end than said first end, said pair of supports including a first support and a second support, said leg corresponding to said first support being coextensive with said front side having said slot corresponding to said first support being aligned with said vertical edge, said leg corresponding to said second support being coextensive with said back side having said slot corresponding to said second support being aligned with said vertical edge, said leg corresponding to said first support having an inwardly facing surface with respect to said panel, a pair of bolts, each of said bolts being coupled to and extending upwardly from said first surface of said panel, said bolts being spaced apart from each other, each of said bolts being positioned proximate said inwardly facing surface, and a ruler being coupled to said inwardly facing surface of said first support, said ruler being aligned with said panel, said ruler extending between said first end corresponding to said first support and said slot corresponding to said first support;

said miter having a first angled side and a second angled side, said miter having a pair of slots extending therethrough, said slots being spaced apart from each other and extending substantially between said first angled side and said second angled side, said miter being positioned in a first position having each of said bolts extending upwardly through a selected one of said slots having said first angled side facing said vertical edge on said panel wherein said first angled side is configured abut the board thereby facilitating the board to be positioned at a first angle with respect to said panel, said miter being positioned in a second position having each of said bolts extending upwardly through a selected one of said slots having said second angled side facing said vertical edge on said panel wherein said second angled side is configured abut the board thereby facilitating the board to be positioned at a second angle with respect to said panel;

a stop being slidably positioned in said notch when said miter is positioned in said first position wherein said stop is configured to abut the board when the board is positioned against said first angled side thereby facilitating the board to be secured on said panel;

a pair of fasteners, each of said fasteners engaging an associated one of said bolts when said miter is positioned on said bolts such that said miter is removably coupled to said bolts; and each of said tracks extending between said foot corresponding to said first support and said foot corresponding to said second support having each of said tracks being spaced from said panel, each of said tracks being positioned on opposite sides of said slot in each of said supports, said guide on said circular saw being slidably coupled to each of said tracks having said blade on said circular saw being positioned within said slot corresponding to said second support, said circular saw being urgeable to travel along said tracks having said blade travelling along said vertical edge on said panel wherein said blade is configured to cut the board at the first angle and the second angle when the board is positioned against said miter.

* * * * *